United States Patent
Pantsurkin

(10) Patent No.: US 10,941,336 B2
(45) Date of Patent: Mar. 9, 2021

(54) HYDRAULIC FRACTURING METHOD USING NON-STANDARD PROPPANT

(71) Applicant: SCHLUMBERGER TECNOLOGY CORPORATION, Sugar Land, TX (US)

(72) Inventor: Danil Sergeevich Pantsurkin, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 54 days.

(21) Appl. No.: 16/097,335

(22) PCT Filed: Apr. 29, 2016

(86) PCT No.: PCT/RU2016/000260
§ 371 (c)(1),
(2) Date: Oct. 29, 2018

(87) PCT Pub. No.: WO2017/188842
PCT Pub. Date: Nov. 2, 2017

(65) Prior Publication Data
US 2019/0136121 A1    May 9, 2019

(51) Int. Cl.
*C09K 8/80* (2006.01)
*E21B 43/267* (2006.01)
(Continued)

(52) U.S. Cl.
CPC ............... *C09K 8/80* (2013.01); *C09J 4/00* (2013.01); *C09J 7/385* (2018.01); *C09K 8/68* (2013.01);
(Continued)

(58) Field of Classification Search
CPC ... C09K 8/68; C09K 8/80; C09K 8/88; C09K 8/92; E21B 43/26; E21B 43/267; C09J 7/385; C09J 4/00; C09J 133/04
See application file for complete search history.

(56) References Cited

U.S. PATENT DOCUMENTS 5,582,249 A    12/1996  Caveny et al.
6,776,235 B1    8/2004  England
(Continued)

FOREIGN PATENT DOCUMENTS

WO    2008115097 A2    9/2008
WO    2009078745 A1    6/2009
(Continued)

OTHER PUBLICATIONS

English translation of International Search Report issued in International Patent Appl. No. PCT/RU2016/000260 dated Feb. 9, 2017; 2 pages.
(Continued)

*Primary Examiner* — Crystal J Miller

(57) ABSTRACT

The present disclosure provides a method for hydraulic fracturing of a formation penetrated by a wellbore, the method comprising: providing a proppant and a two-component adhesive; injecting a proppant-free fracturing fluid into the wellbore to form a fracture in the formation; pulse-injecting the fracturing fluid into the wellbore, wherein pulse-injection provides for at least one injection pulse of the proppant-laden fracturing fluid comprising the two-component adhesive and at least one injection pulse of the proppant-free fracturing fluid, wherein the proppant is characterized by at least one of the following properties: the resistance of the proppant to crushing is lower than the rock closure pressure; when a pressure of 20.7 MPa is applied to this proppant, at least 5 wt. % of particles with a size of less than 100 μm are formed; the size distribution of the proppant is 10-1,000 μm; the sphericity and/or roundness of the proppant is less than 0.6; the solubility of the proppant in acids is 5-20 wt. %; providing an initiation mechanism to induce the adhesion of proppant particles to form bonded
(Continued)

clusters that prevent the fracture from closing and form network channels open for the flow of fluids.

20 Claims, 1 Drawing Sheet

(51) Int. Cl.
*C09K 8/88* (2006.01)
*C09K 8/92* (2006.01)
*C09J 7/38* (2018.01)
*C09J 4/00* (2006.01)
*C09K 8/68* (2006.01)
*E21B 43/26* (2006.01)
*C09J 133/04* (2006.01)

(52) U.S. Cl.
CPC ............. *C09K 8/88* (2013.01); *C09K 8/92* (2013.01); *E21B 43/267* (2013.01); *C09J 133/04* (2013.01); *E21B 43/26* (2013.01)

(56) References Cited

U.S. PATENT DOCUMENTS

| | | | |
|---|---|---|---|
| 7,334,635 B2 | 2/2008 | Nguyen | |
| 7,581,590 B2 | 9/2009 | Lesko et al. | |
| 7,595,280 B2 | 9/2009 | Welton et al. | |
| 8,003,214 B2 | 8/2011 | Rediger et al. | |
| 8,066,068 B2 | 11/2011 | Lesko et al. | |
| 8,113,283 B2 | 2/2012 | Welton et al. | |
| 2007/0042912 A1* | 2/2007 | Welton ............... | C09K 8/508 507/203 |
| 2008/0011477 A1* | 1/2008 | Rediger ............... | C09K 8/64 166/280.2 |
| 2008/0135242 A1 | 6/2008 | Lesko et al. | |
| 2013/0105166 A1* | 5/2013 | Medvedev ........... | E21B 43/267 166/308.1 |
| 2014/0290943 A1* | 10/2014 | Ladva ............... | E21B 43/267 166/280.1 |
| 2014/0318779 A1* | 10/2014 | Welton ............... | E21B 43/267 166/280.2 |
| 2015/0167443 A1* | 6/2015 | Litvinets ............ | C09K 8/665 166/280.1 |
| 2016/0153273 A1* | 6/2016 | Nguyen ............... | E21B 43/267 166/280.1 |
| 2017/0121593 A1 | 5/2017 | Pantsurkin et al. | |

FOREIGN PATENT DOCUMENTS

| | | |
|---|---|---|
| WO | 2011050046 A1 | 4/2011 |
| WO | 2016140591 A1 | 9/2016 |

OTHER PUBLICATIONS

International Preliminary Report on Patentability issued in International Patent Appl. No. PCT/RU2016/000260 dated Nov. 8, 2018; 9 pages.

* cited by examiner

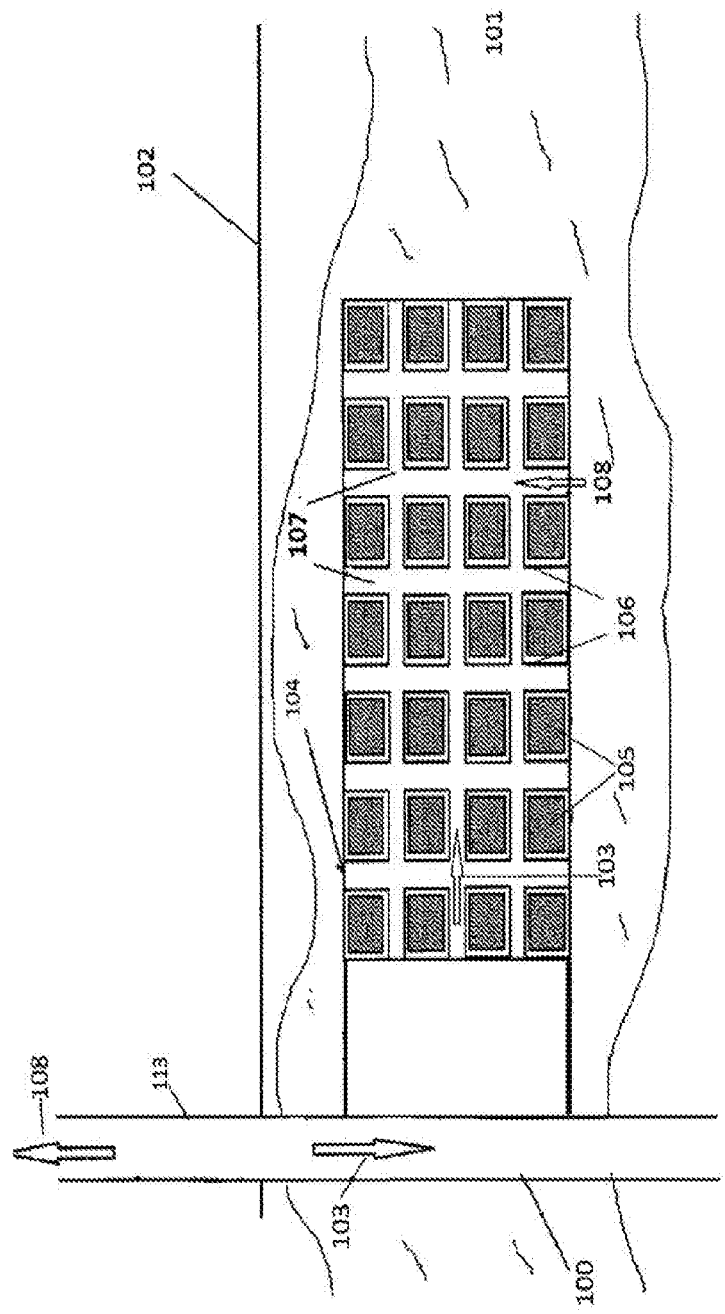

HYDRAULIC FRACTURING METHOD USING NON-STANDARD PROPPANT

FIELD OF THE DISCLOSURE

The present disclosure relates to heterogeneous proppant placement (HPP) and explains a new approach to hydraulic fracturing. A heterogeneous proppant pack is formed when several individual proppant clusters are placed within the fracture. This (heterogeneous) pack of individual clusters keeps the fracture open, at the same time providing a network of channels, which are completely open for the flow of hydrocarbons.

The fracture conductivity is a parameter that affects the well productivity or injectivity. For an HPP fracture, the conductivity is determined by the presence of channels. The conductivity of an HPP fracture is higher than that of a HPP-free (homogeneous) fracture until the flow paths for hydrocarbons (channels) remain open.

The quality of a heterogeneous proppant pack is determined by multiple parameters, such as the size of clusters and the width of channels, as well as the resistance of clusters to the impact of external factors, such as the fracture closure pressure, the fluid drag force, etc. One of the issues is a flowback of rock and small proppant particles that are formed after crushing under the closure pressure. The above issues can be solved by means of cluster strengthening with adhesives.

BACKGROUND

U.S. Pat. No. 6,776,235 'Hydraulic Fracturing Method' filed by Schlumberger on Jul. 23, 2002 discloses a method and means for optimizing fracture conductivity. The well productivity is increased by means of fracturing fluids varying in either their ability of transporting proppant to a fracture or the amount of transported proppant that are sequentially injected into the wellbore in alternate stages to enhance the proppant placement. The propped fractures obtained following this process are characterized by a series of proppant clusters spread along the full length of the fracture. In another words, the clusters of solid particles form 'pillars' that keep the fracture open along its full length and produce a plurality of channels for the motion of formation fluids.

Patent application US 2008135242 'Heterogeneous Proppant Placement in a Fracture with a Removable channel-forming filler' filed by Schlumberger on Dec. 8, 2006 (U.S. Pat. No. 7,581,590 (B2), U.S. Pat. No. 8,066,068 (B2)) discloses a method comprising the injection of a fracturing fluid comprising a proppant and a channel-forming filler material called a 'channelant' into the fracture through a wellbore, the heterogeneous proppant placement within the fracture as a plurality of proppant clusters or pillars spaced apart by the channelant, and the removal of the channel-forming filler material and formation of open channels around the proppant pillars to ensure the fluid flow from the formation through the fracture toward the wellbore.

The solution U.S. Pat. No. 5,582,249 A describes the use of an adhesive coated material mixed with a proppant for hydraulic fracturing and other formation treatment methods, which inhibits the flowback of proppant particles and rock and stabilizes the proppant within the formation/fracture. Typical coating materials include glass or ceramic fibers, derivatives of polyolefins, polyamides, polyvinyls and cellulose in the form of particles, fibers, ribbons or flakes.

The solution U.S. Pat. No. 8,113,283 B2 describes the method for improving a low-quality proppant and its subsequent use. The improvement is achieved by coating (at least partially) the proppant with an aqueous tackifying mixture. This mixture is made of an aqueous tackifier and an aqueous liquid.

The solution PCT/RU2015/000129 describes various methods for strengthening the proppant clusters and increasing their lifespan. The solution implies both separate use of these methods and combination thereof to achieve better placement, strengthening and resistance to proppant flowback.

The solution WO/2016/003303 describes various methods for cluster strengthening by using organic and inorganic fibers that prevents proppant clusters from disintegrating under the pressure of rock.

The core objective of the solutions known from the prior art is to provide possibilities for creating a heterogeneous proppant pack, whereas the present disclosure is aimed at strong attachment (adhesion) of proppant particles at the point of applying the fracture closure pressure to the cluster or attaching proppant particles to the outer border of the cluster. Further, the present disclosure will allow the use of a non-standard/low-quality proppant in hydraulic fracturing treatments using the heterogeneous proppant placement. Furthermore, the present disclosure will allow an increase in the resistance of the bonded proppant clusters to the drag force of the fluid flow if these clusters are composed of a too fine material, wherein the bonded cluster has a stability area along the fluid flow at a fluid velocity of more than 3 m/sec, and allow a decrease in the flowback of small proppant particles (both originally present therein and formed due to proppant crushing).

Accordingly, the prior art requires the creation of means for increasing the well lifespan by enhancing the resistance of the proppant clusters to the drag force of the fluid flow, the reduction in the flowback of small proppant particles, a strong attachment of proppant particles at the point of applying the fracture closure pressure to the cluster or attaching proppant particles to the outer border of the cluster, the use of a non-standard/low-quality proppant in the hydraulic fracturing treatments using the heterogeneous proppant placement.

SUMMARY

The present disclosure discloses a new approach to the design of HPP treatments for the production and injection wells using adhesives to strengthen the proppant clusters used in both horizontal and vertical wells. Several embodiments of hydraulic fracturing methods and a method for fluid extraction from a formation penetrated by a wellbore are also proposed. The approach implies a strong attachment of proppant particles at the point of applying the fracture closure pressure to the cluster or attaching proppant particles to the outer border of the cluster. The result is achieved by filling (at least partially) the pore space between the proppant particles with an adhesive and their strong attachment to each other and to the rock. In particular, this approach is developed for the technology of heterogeneous placement of proppant with non-standard properties, which allows the use of non-standard/low-quality proppants in HPP treatments. Nevertheless, even this technology is limited with a non-standard proppant specification, specifically, with the size range of non-standard proppant pellets: 10 to 1,000 μm. This limitation is related to the low resistance of non-standard proppant (and proppant) clusters to the drag force of the fluid flow if they are composed of a too fine material. Another technical issue being tackled is the flowback of proppant fines (both originally present therein and formed due to proppant crushing).

According to one embodiment of the present disclosure, a method for hydraulic fracturing of a formation penetrated by a wellbore is proposed, the method comprising providing a proppant and a two-component adhesive, the two-component adhesive including the encapsulated components of the two-component adhesive; injecting a proppant-free fracturing fluid into the wellbore to form a fracture in the formation; pulse-injecting the fracturing fluid into the wellbore, wherein pulse-injection provides for at least one injection pulse of the proppant-laden fracturing fluid comprising the encapsulated components of the two-component adhesive and at least one injection pulse of the proppant-free fracturing fluid, wherein the proppant is characterized by at least one of the following properties: the resistance of the proppant to crushing is lower than the rock closure pressure; when a pressure of 20.7 MPa is applied to this proppant, at least 5 wt. % of particles with a size of less than 100 µm are formed; the size distribution of the proppant is 10-1,000 µm; the sphericity and/or roundness of the proppant is less than 0.6; the solubility of the proppant in acids is 5-20 wt. %; and providing an initiation mechanism to induce the adhesion of proppant particles to form bonded clusters that prevent the fracture from closing and form network channels open for the flow of fluids.

The embodiments of a hydraulic fracturing method are also provided, wherein a proppant and a two-component adhesive are used, wherein the two-component adhesive comprises one encapsulated component of the two-component adhesive and the second liquid component of the two-component adhesive, or a proppant and a pressure-sensitive two-component adhesive are used, or a proppant and a two-component adhesive are used, wherein one component is a solid-phase component.

A method for fluid extraction from a formation penetrated by a wellbore is also provided, the method comprising hydraulic fracturing in accordance with a hydraulic fracturing method of any of the embodiments of the hydraulic fracturing methods, wherein a fracturing fluid that is a cross-linked fracturing fluid is used during the pulse-injection of the fracturing fluid; providing a channel for extracting the fluid to the surface; introducing a breaker fluid used for reducing viscosity of the cross-linked fracturing fluid; and delaying the beginning of the formation fluid extraction to ensure adhesion of the cluster and reduce the viscosity of the cross-linked fracturing fluid; and then extracting the fluid from the formation via the extraction channel.

BRIEF DESCRIPTION OF DRAWINGS

FIG. 1 shows a general schematic of implementing the embodiments of hydraulic fracturing methods and the fluid extraction method.

DETAILED DESCRIPTION

According to the proposed technique, FIG. 1 shows a well 100, which penetrates an oil and gas bearing formation 101, into which a fracturing fluid 103 is injected from the surface 102 with forming of at least one fracture 104.

The fracturing fluid 103 is then pulse-injected into the well 100 to form a fracture, wherein the pulse mode provides for the pulse injection of the fracturing fluid into the wellbore, wherein the pulse mode of injection provides for at least one injection pulse of the proppant-laden fracturing fluid comprising the two-component adhesive and at least one injection pulse of the proppant-free fracturing fluid. A pad fluid (a frac fluid without proppant) is used as the proppant-free fracturing fluid.

By using the pulse injection of the fracturing fluid, the proppant clusters 105, 106 and channels 107 are formed in the fracture 104, through which a fluid 108 is extracted from the formation 101 to the surface 102.

The present disclosure provides possibilities for using a proppant comparable by quality with a non-standard proppant or even a proppant of lower quality. Such a proppant has at least one of the following properties (the properties are tested according to the ISO 13503-2:2006(E) standard):

The resistance of given proppant to crushing is lower than the closure pressure of the rock, into which it is injected. The proppant resistance to crushing is the pressure, at which not more than 10 wt. % of particles are formed with a size smaller than the lower size limit of given proppant. At the pressure of 20.7 MPa applied to given proppant, at least 5 wt. % of particles are formed with a size of less than 100 µm. Given proppant has a wide size distribution, for example, 10-1,000 µm. The sphericity and/or roundness is less than 0.6, the solubility in acids is 5-20 wt. %.

A pressure-sensitive adhesive or a two-component adhesive activated by chemical interactions between components of the adhesive and is used as a two-component adhesive.

The present approach implies the use of pressure-sensitive adhesives or two-component epoxy resins. The pressure-sensitive adhesives are a two-component mixture, in which bonds are formed between the mixture and the substrate (a rock or a proppant) when pressure is applied. The pressure-sensitive adhesives are the adhesive polymer materials that form strong adhesive bonds with substrates of various chemical nature when the external pressure is applied to the adhesive film for a short period of time and that maintain their adhesive ability even after the bond is broken. This is a class of materials that are characterized by adhesiveness under operating conditions and differ from construction-type adhesives and glues, because formation of adhesive bond does not initiated by high temperatures, solvent removal, and is not accompanied by changes in the chemical nature of the original polymer.

A two-component mixture, in which the bonds within the mixture and between the mixture and the substrate are formed due to the chemical interaction between the components of the two-component adhesive (resin and hardener) is used as a two-component adhesive that ensures chemical interaction between the components of the two-component adhesive.

Non-limiting examples of such bonds are provided below:

Pressure-sensitive adhesives are elastomers selected from the group comprising: acrylic resin, butyl rubber, ethylene-vinyl acetate, nitrile resin, silicone rubber and styrene copolymers, or mixtures thereof and a tackifier, which depends on the elastomer and can be: ester gum, aliphatic, cycloaliphatic, and aromatic resins, hydrogenated hydrocarbon resins, terpene-phenolic resins, or mixtures thereof.

A resin selected from the group comprising epoxy resin, a mixture of epichlorohydrin with bisphenol A, bisphenol F or aromatic amines, phenol-formaldehyde resin, or mixtures thereof and a hardener selected from the group comprising polyfunctional amines, acids and acid anhydrides, phenols, alcohols, thiols, or mixtures thereof are used as a two-component adhesive that ensures chemical interaction between the components of the two-component adhesive.

To perform treatments using the present disclosure, a typical HPP technology—HiWAY™—the pulse proppant injection is provided, in which pulses of clean fluid and the proppant-laden fluid are alternately injected.

Several embodiments of the approach described in this disclosure are possible.

Encapsulating both components (the pressure-sensitive adhesives or the two-component adhesive that ensures chemical interaction between the components of the two-component adhesive) and mixing them with the proppant on the surface with subsequent injection. The encapsulated components of the two-component adhesive are the encapsulated components of a two-component adhesive, with the capsules thereof being destroyed by the fracture closure pressure or by dissolution of the capsule wall material.

The adhesion of the proppant will occur within the cluster, while the outer border of the cluster will remain unbounded, since virtually no pressure is applied to the outer border of the cluster.

In this embodiment, the concentration of the encapsulated pressure-sensitive adhesives or the two-component adhesive that ensures chemical interaction between the components of the two-component adhesive is 1-30% of the proppant weight. The size of the encapsulated pellets should be 0.1-1 mm. The shell thickness of the encapsulated pellets is 0.01-0.2 mm, and the encapsulated pellets fail to withstand a pressure above 6.9 MPa.

Encapsulating one of the reagents (the pressure-sensitive adhesives or the two-component adhesive activated by chemical interactions between components of the adhesive) and mixing them with the proppant on the surface with subsequent injection. The component of the pressure-sensitive adhesives or the two-component adhesive activated by chemical interactions between components of the adhesive will be released at the moment when the fracture closure pressure is applied. The second component of the pressure-sensitive adhesives or the two-component adhesive activated by chemical interactions between components of the adhesive is added to the fracturing fluid or to the overdisplacement fluid. The adhesion of the proppant will occur both within the cluster and on its outer border. In this case, the concentration of the encapsulated component of the pressure-sensitive adhesives or the two-component adhesive activated by chemical interactions between components of the adhesive is 1-20% of the proppant weight. The size of the encapsulated pellets is 0.1-1 mm. The shell thickness of the encapsulated pellets is 0.01-0.2 mm. The encapsulated pellets fail to withstand a pressure above 6.9 MPa. The injected amount of the second component is 20-200% of the encapsulated component volume.

In another embodiment, the components of the pressure-sensitive adhesives are added to the fracturing fluid or to the overdisplacement fluid. The components of the pressure-sensitive adhesives will be activated at the time when and at the points where the fracture closure pressure is applied. The adhesion of the proppant will occur inside the cluster, while the outer border of the cluster will remain unbounded, since virtually no pressure is applied to the outer border of the cluster.

In this embodiment, the total concentration of the components of the pressure-sensitive adhesives is 1-40% of the fracturing fluid volume.

If one of the components of the pressure-sensitive adhesives or the two-component activated by chemical interactions between components of the adhesive is solid, then it can be added to the proppant prior to the injection. The second component of the two-component adhesive is added by one of the above methods. The concentration of the solid component of the pressure-sensitive adhesives or the two-component adhesive activated by chemical interactions between components of the adhesive is 1-20% of the proppant weight. The particle size of the solid component is 0.1-1 mm.

If the second component is encapsulated, then the concentration of the encapsulated component of the pressure-sensitive adhesives or the two-component adhesive activated by chemical interactions between components of the adhesive is 1-20% of the proppant weight. The size of the encapsulated pellets is 0.1-1 mm. The shell thickness of the encapsulated pellets is 0.01-0.2 mm. The encapsulated pellets fail to withstand a pressure above 6.9 MPa. If the second component is added in its liquid state, then the pressure-sensitive adhesives can be injected by this method. The injected amount of the second component is 20-200% of the solid component volume.

This method can also be used when the well flowback is delayed until the adhesion of the cluster and the destruction of the cross-linked fracturing fluid, which either allows the proppant particles to be retained within the cluster or enables the particles to settle to the bottom of the fracture, and in this case an extremely fine proppant, up to 50 can be used. The delivery of the adhesive mixture (the pressure-sensitive adhesives or the two-component adhesive activated by chemical interactions between components of the adhesive) can be carried out by any of the above methods. The well flowback is delayed until both conditions are met (the adhesion of the cluster and the destruction of the cross-linked fracturing fluid). When the well flowback is delayed, a closure pressure of at least 7.0 MPa is applied to the proppant clusters.

According to this embodiment, with reference to FIG. 1, a method of extracting the fluid from the formation 101 intersected by the wellbore 100 to the surface 102 is proposed, in which hydraulic fracturing is performed by injecting the fracturing fluid 103 in accordance with any of the above hydraulic fracturing techniques, wherein at the stage of the fracturing fluid injection in the pulse mode, the cross-linked fracturing fluid is used. Then a channel 113 is provided for extracting the fluid to the surface and a breaker is introduced, which is used for reducing viscosity of the cross-linked fracturing fluid. Then the beginning of the formation fluid extraction is delayed to ensure the adhesion of the cluster and reduce the viscosity of the fracturing fluid, and the fluid 108 is extracted from the formation 101 via the channel 113.

As a result of using any of the above embodiments of the formation treatment, the following is ensured:

a complete or partial adhesion of the cluster, which will result in the strengthening of the cluster, its increased resistance to the drag force of the fluid flow, and a reduced disintegration under the closure pressure;

a reduced porosity of the cluster and, therefore, its reduced conductivity up to a complete loss. In the HPP treatments, this phenomenon of low porosity is detrimental, because the conductivity is provided by channels;

retention of small proppant particles within the cluster.

When the encapsulated components of the pressure-sensitive adhesives or the two-component adhesive activated by chemical interactions between components of the adhesive are used, the adhesion will occur within the cluster at the point, where the pressure is applied.

When the components of the pressure-sensitive adhesives or the two-component adhesive activated by chemical interactions between components of the adhesive that ensures chemical interaction between the components of the two-component adhesive are added to the fracturing fluid or the overdisplacement fluid, the adhesion will occur both within the cluster and on its outer border (for the two-component adhesive activated by chemical interactions between components of the adhesive).

Although the above description concerns the oil production methods, the application of this technique is still possible for the production and injection of other fluids (liquids or gases, and mixtures thereof).

It is apparent that the above embodiments shall not be regarded as a limitation of the patent claims scope. It is clear for a person skilled in the art that it is possible to introduce many changes to the technique described above without departing from the principles of the claimed.

The invention claimed is:

1. A method of hydraulic fracturing of a formation penetrated by a wellbore, the method comprising:
providing a proppant-free fracturing fluid and a proppant-laden fracturing fluid,
wherein the proppant-laden fracturing fluid comprises a proppant and an additive comprising a two-component adhesive, wherein the two-component adhesive is encapsulated, and wherein the two-component adhesive is separate from the proppant;
injecting the proppant-free fracturing fluid into the wellbore to form a fracture in the formation;
pulse-injecting the proppant-free fracturing fluid and the proppant-laden fracturing fluid, wherein the pulse-injecting provides for at least one injection pulse of the proppant-laden fracturing fluid and at least one injection pulse of the proppant-free fracturing fluid, wherein the proppant is characterized by at least one of the following properties: the proppant has a crush resistance that is lower than a fracture closure pressure; when a pressure of 20.7 MPa is applied to the proppant, at least 5 wt % of particles with a size smaller than 100 μm are formed; a size distribution of the proppant is 10-1,000 μm; the proppant has a sphericity and/or roundness lower than 0.6; the proppant has a solubility in acids between 5-20 wt %;
providing an initiation mechanism to induce the adhesion of the proppant to form bonded clusters that prevent the fracture from closing; and
forming a network of open channels for fluid flow around the bonded clusters.

2. The method of claim 1, wherein the two-component adhesive is a pressure-sensitive adhesive or activated by chemical interactions between components of the two-component adhesive.

3. The method of claim 2, wherein the initiation mechanism of adhesion is application of pressure to the two-component adhesive.

4. The method of claim 2, wherein the initiation mechanism of adhesion is chemical interaction between the components of the two-component adhesive.

5. The method of claim 2, wherein the pressure-sensitive adhesive comprises an elastomer comprising acrylic resin, butyl rubber, ethylene-vinyl acetate, nitrile resin, silicone rubber and styrene copolymers, or mixtures thereof; and a tackifier comprising ester gum, aliphatic, cycloaliphatic and aromatic resins, hydrogenated hydrocarbon resins, terpene-phenolic resins, or mixtures thereof.

6. The method of claim 1, wherein the two-component adhesive comprises a resin comprising epoxy resin, a mixture of epichlorohydrin with bisphenol A, bisphenol F or aromatic amines, phenol-formaldehyde resin, or mixtures thereof; and a hardener comprising polyfunctional amines, acids and acid anhydrides, phenols, alcohols, thiols, or mixtures thereof.

7. The method of claim 1, wherein the encapsulated two-component adhesive is released due to fracture closure pressure or dissolution of capsule wall material.

8. The method of claim 1, wherein the concentration of the encapsulated two-component adhesive is 1-30% of the proppant weight.

9. The method of claim 1, wherein a capsule size of the encapsulated two-component adhesive is between 0.1-1 mm.

10. The method of claim 1, wherein a capsule thickness of the encapsulated two-component adhesive is 0.01-0.2 mm.

11. A method of hydraulic fracturing of a formation penetrated by a wellbore, the method comprising:
providing a proppant-free fracturing fluid and a proppant-laden fracturing fluid, wherein the proppant-laden fracturing fluid comprises a proppant and an additive comprising a two-component adhesive, wherein the two-component adhesive comprises a first component in an encapsulated form and a second-component in liquid form, and wherein the two-component adhesive is separate from the proppant;
injecting the proppant-free fracturing fluid into the wellbore to form a fracture in the formation;
pulse-injecting the proppant-free fracturing fluid and the proppant-laden fracturing fluid, wherein the pulse-injecting provides for at least one injection pulse of the proppant-laden fracturing fluid, and at least one injection pulse of the proppant-free fracturing fluid comprising the second component, wherein the proppant is characterized by at least one of the following properties: the proppant has a crush resistance that is lower than a fracture closure pressure; when a pressure of 20.7 MPa is applied to the proppant, at least 5 wt % of particles with a size smaller than 100 μm are formed; a size distribution of the proppant is 10-1,000 μm; the proppant has a sphericity and/or roundness lower than 0.6; the proppant has a solubility in acids between 5-20 wt %;
providing an initiation mechanism to induce the adhesion of the proppant to form bonded clusters that prevent the fracture from closing; and
forming a network of open channels for fluid flow around the bonded clusters.

12. The method of claim 11, wherein the two-component adhesive is a pressure-sensitive adhesive or activated by chemical interaction between the first and second components of the two-component adhesive.

13. The method of claim 11, wherein the initiation mechanism of adhesion for the first component is application of pressure.

14. The method of claim 11, wherein the first component comprises an elastomer comprising acrylic resin, butyl rubber, ethylene-vinyl acetate, nitrile resin, silicone rubber and styrene copolymers, or mixtures thereof; and a tackifier-comprising ester gum, aliphatic, cycloaliphatic, and aromatic resins, hydrogenated hydrocarbon resins, terpene-phenolic resins, or mixtures thereof.

15. The method of claim 11, wherein the initiation mechanism of adhesion is chemical interaction between the first and second components of the two-component adhesive.

16. The method of claim 11, wherein the two-component adhesive comprises a resin comprising epoxy resin, a mixture of epichlorohydrin with bisphenol A, bisphenol F or aromatic amines, phenol-formaldehyde resin, or mixtures thereof; and a hardener comprising polyfunctional amines, acids and acid anhydrides, phenols, alcohols, thiols, or mixtures thereof.

17. The method of claim 11, wherein one of the components of the two-component adhesive is released due to fracture closure pressure or dissolution of capsule wall material.

18. The method of claim 11, wherein a capsule size of the first component is between 0.1-1 mm.

19. The method of claim 11, wherein the first component is present at a concentration between 1-30% of the proppant weight.

20. The method of claim 11, wherein a capsule thickness of the first component is between 0.01-0.2 mm.

* * * * *